(12) United States Patent
Park et al.

(10) Patent No.: US 11,726,572 B2
(45) Date of Patent: Aug. 15, 2023

(54) DISPLAY APPARATUS FOR VEHICLE

(71) Applicant: HYUNDAI MOBIS CO., LTD., Seoul (KR)

(72) Inventors: Sung Hyun Park, Hwaseong-si (KR); Kyeong Jun Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 4 days.

(21) Appl. No.: 17/557,976

(22) Filed: Dec. 21, 2021

(65) Prior Publication Data

US 2022/0197387 A1 Jun. 23, 2022

(30) Foreign Application Priority Data

Dec. 23, 2020 (KR) .................. 10-2020-0182679

(51) Int. Cl.
*G06F 3/01* (2006.01)
*B60R 11/02* (2006.01)
*G02F 1/1333* (2006.01)

(52) U.S. Cl.
CPC .......... *G06F 3/016* (2013.01); *B60R 11/0235* (2013.01); *G02F 1/13338* (2013.01); *G02F 1/133308* (2013.01)

(58) Field of Classification Search
CPC ...... B60K 2370/152; B60K 2370/1529; B60K 2370/80; B60K 2370/816; G02F 1/133308
See application file for complete search history.

(56) References Cited

U.S. PATENT DOCUMENTS

2018/0356928 A1* 12/2018 Ao .................. G06F 1/1626
2020/0278750 A1* 9/2020 Yeon ................ B06B 1/0611

* cited by examiner

*Primary Examiner* — Edward J Glick
*Assistant Examiner* — David Y Chung
(74) *Attorney, Agent, or Firm* — NovoTechIP International PLLC

(57) ABSTRACT

A display apparatus for a vehicle according to one embodiment of the present invention includes a display module, a floating panel positioned on a surface of the display module, a pair of suspension brackets which are connected to a rear side of the floating panel with a gap therebetween, and a liquid crystal display (LCD) bracket of which both ends are connected to and surrounded by the pair of suspension brackets.

11 Claims, 4 Drawing Sheets

DISPLAY APPARATUS FOR VEHICLE

CROSS-REFERENCE TO RELATED APPLICATIONS

This application claims the benefit under 35 USC § 119(a) of Korean Patent Application No. 10-2020-0182679, filed on Dec. 23, 2020 in the Korean Intellectual Property Office, the entire disclosure of which is incorporated herein by reference for all purposes.

BACKGROUND OF THE INVENTION

1. Field of the Invention

The present invention relates to a display apparatus for a vehicle having a haptic structure.

2. Discussion of Related Art

Generally, haptics is technology of providing a sensation of actually touching a specific object through a tactile sensation. When a user presses a touch screen, vibration is generated, and a tactile sensation of vibration stimulation generated at this time is transferred through the skin of a pressing finger.

Conventionally, technology of transferring a tactile sensation using vibration perpendicular to the skin has been mainstream. However, in this case, an action, in which the skin perpendicularly comes into contact with a screen several times due to perpendicular vibration, is repeatedly performed, and since the stimulation provides a feeling of electric shock, there is a problem in that the user perceives an unpleasant tactile sensation.

BRIEF SUMMARY OF THE INVENTION

The present invention is directed to providing a display apparatus for a vehicle which allows a user to receive convenient and natural haptic feedback through a haptic structure using a lateral vibration type suspension bracket.

Objectives which should be solved through the present invention are not limited to the above-described objective, and other objectives, which are not described above, will be clearly understood by those skilled in the art through the following descriptions.

According to an aspect of the present invention, there is provided a display apparatus for a vehicle, the display apparatus including a display module, a floating panel positioned on a surface of the display module, a pair of suspension brackets which are connected to a rear side of the floating panel with a gap therebetween, and a liquid crystal display (LCD) bracket of which both ends are connected to and surrounded by the pair of suspension brackets.

Magnetic parts and coils may be disposed at a connection area between the suspension brackets and the LCD bracket, and the magnetic parts and the coils may generate lateral vibration.

The suspension bracket may include a lower end plate which faces and is connected to the floating panel, a plurality of support panels expending perpendicularly from both ends of the lower end plate, and an upper end plate which is one plate connecting the plurality of support panels, is positioned at a side opposite to the lower end plate, and faces and is connected to the LCD bracket.

The upper end plate and the lower end plate may include a plurality of coupling holes which are formed to pass through the upper end plate and the lower end plate to allow bolt coupling.

A reinforcement panel, which is formed to extend perpendicularly from the lower end plate to have a "⊂" shape, may be provided between the plurality of support panels.

The magnetic part may be connected to the reinforcement panel, and the coil opposite to the magnetic part may be connected to a side end of the LCD bracket facing the reinforcement panel.

The suspension bracket may be formed as a leaf spring having a "Z" shape.

The LCD bracket may be opposite to the floating panel with a predetermined distance therebetween.

According to another aspect of the present invention, there is provided a display apparatus for a vehicle, the display apparatus including a display module, a floating panel disposed to be spaced reward from the display module, an LCD bracket disposed behind the floating panel, a suspension bracket which is formed to have a leaf spring structure connecting the floating panel and the LCD bracket, a ferromagnetic part connected to the suspension bracket, and a coil connected to the LCD bracket to face the ferromagnetic part.

In this case, the LCD bracket may be opposite to the floating panel with a predetermined distance therebetween.

A predetermined gap may be maintained between the LCD bracket and the floating panel.

The suspension bracket may include a lower end plate which faces and is connected to the floating panel, a plurality of support panels extending perpendicularly from both ends of the lower end plate, and an upper end plate which is one plate connecting the plurality of support panels, is positioned at a side opposite to the lower end plate, and faces and is connected to the LCD bracket.

In this case, a reinforcement panel, which is formed to extend perpendicularly upward from the lower end plate to have a "⊂" shape, may be provided between the plurality of support panels.

The reinforcement panel may include a magnet connection groove formed to be recessed in a part of a section thereof, and the ferromagnetic part may be restrictedly inserted into the magnet connection groove.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Advantages and features of the present invention and methods of achieving the same will be clear with reference to the accompanying drawings and the following detailed embodiments. However, the present invention is not limited to the embodiments to be disclosed below but may be implemented in various different forms, the embodiments are provided in order to fully explain the present invention and fully explain the scope of the present invention for those skilled in the art, and the scope of the present invention is defined by the appended claims. Meanwhile, the terms used herein are provided to describe embodiments of the present invention and not for purposes of limitation. In the specification, unless the context clearly indicates otherwise, the singular forms include the plural forms. The terms "comprise" or "comprising" used in the specification specify some stated components, steps, operations and/or elements but do not preclude the presence or addition of one or more other components, steps, operations and/or elements.

Hereinafter, the exemplary embodiments of the present invention will be described in detail with reference to the accompanying drawings.

Figure 1:
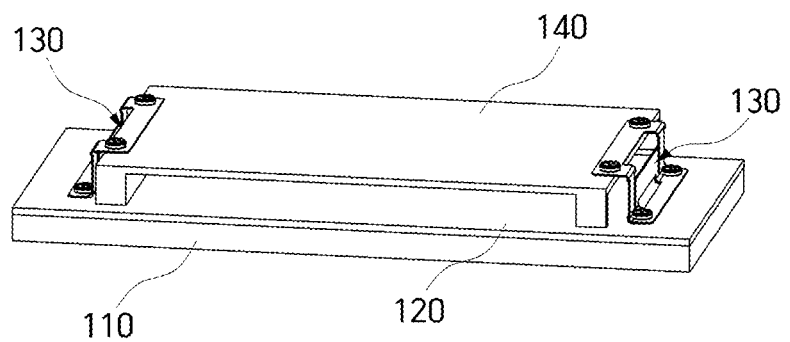
FIG. 1 is a schematic perspective view illustrating a display apparatus for a vehicle according to one embodiment of the present invention.
Figure 1:
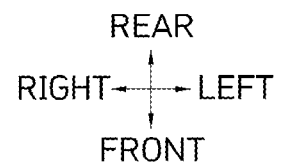
Figure 2:
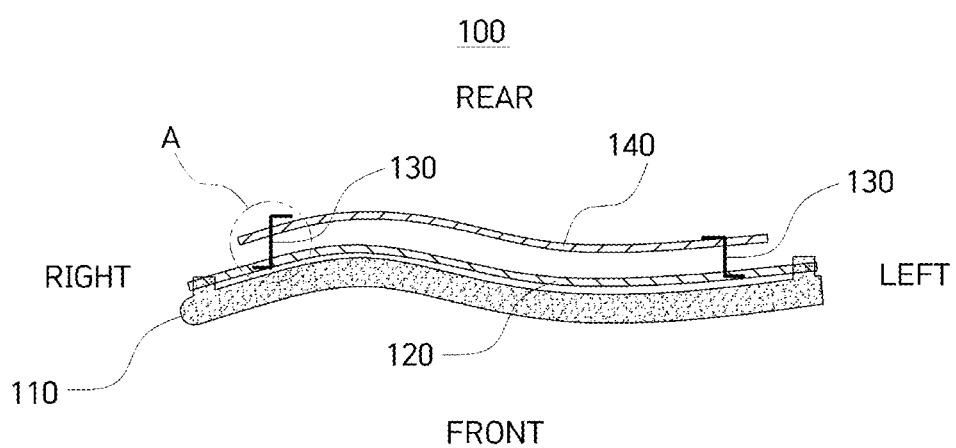
FIG. 2 is a schematic plan view illustrating the display apparatus for a vehicle according to one embodiment of the present invention.
Figure 3:
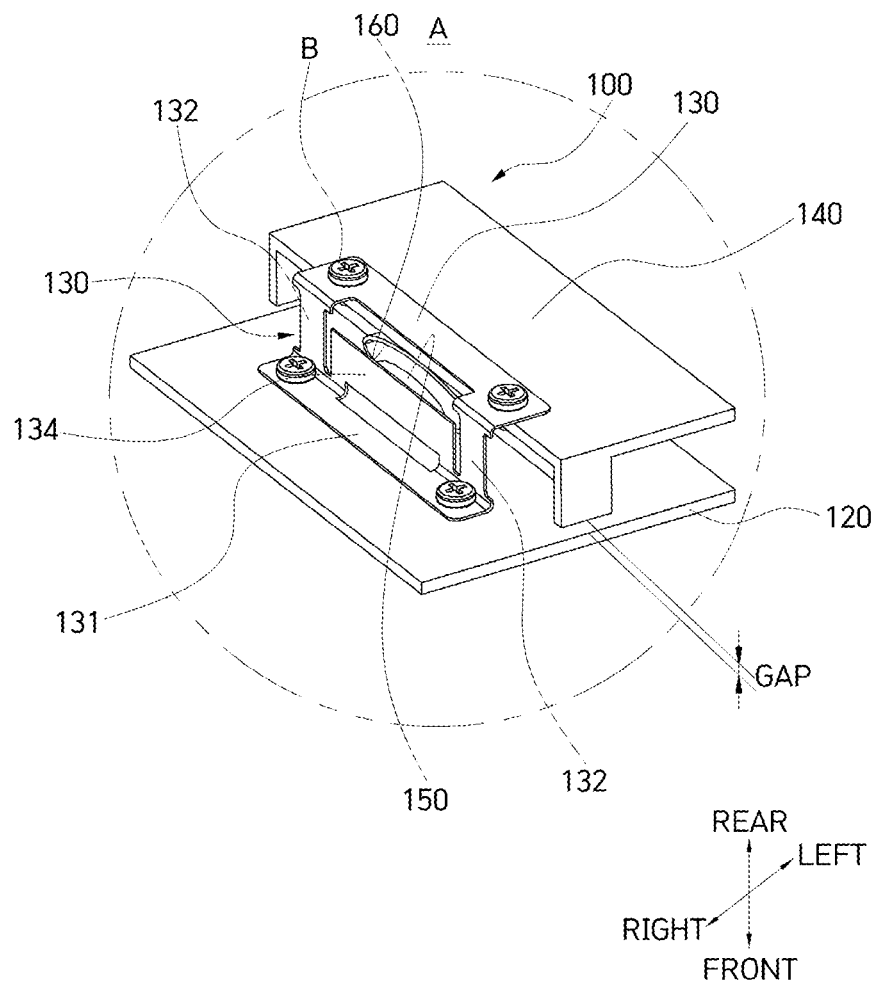
FIG. 3 is a partially enlarged view illustrating region A illustrated in FIG. 2.
Figure 4:
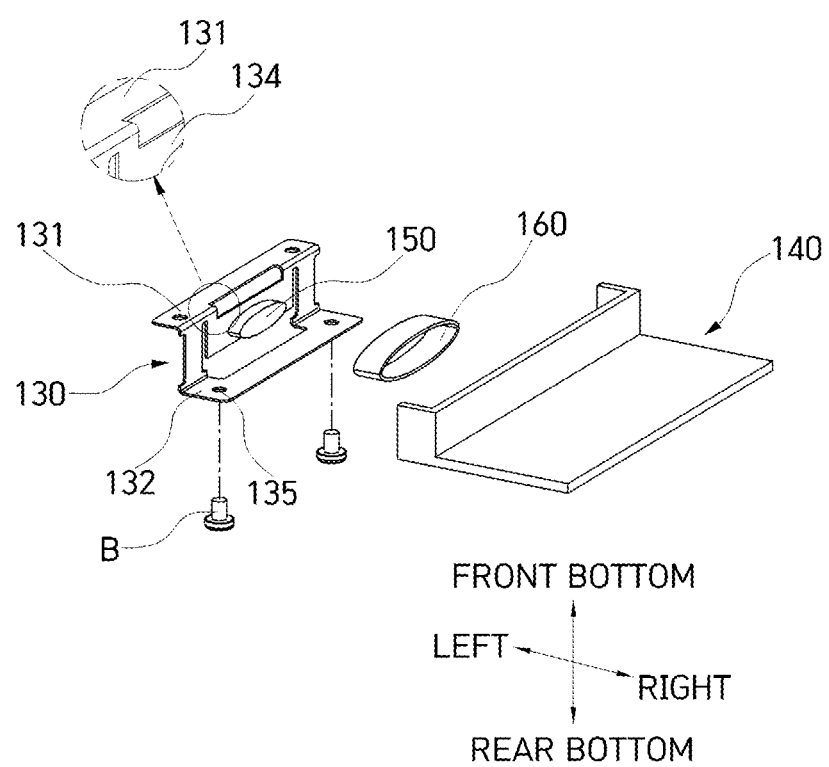
FIG. 4 is a view for describing a haptic structure capable of vibrating laterally in the display apparatus for a vehicle according to one embodiment of the present invention.

FIG. 1 is a schematic perspective view illustrating a display apparatus for a vehicle according to one embodiment of the present invention, FIG. 2 is a schematic plan view illustrating the display apparatus for a vehicle according to one embodiment of the present invention, FIG. 3 is a partially enlarged view illustrating region A illustrated in FIG. 2, and FIG. 4 is a view for describing a haptic structure capable of vibrating laterally in the display apparatus for a vehicle according to one embodiment of the present invention.

Referring to FIGS. 1 to 4, a display apparatus 100 for a vehicle according to one embodiment of the present invention is an apparatus allowing a haptic structure to be implemented and may provide haptic feedback to a user through a tactile sensation.

In this case, in the display apparatus 100 for a vehicle, a fast reaction speed, at which an input signal and a tactile sensation output may be transmitted at the same time, and size adjustment and various patterns of vibration may be implemented by individually adjusting frequencies, amplitudes, and phase differences of a plurality of piezoelectric ceramics.

The display apparatus 100 for a vehicle mainly includes a display module 110, a floating panel 120, suspension brackets 130, a liquid crystal display (LCD) bracket 140, magnetic parts 150, and coils 160.

The display module 110 is an apparatus configured to display a screen and serves as a touch screen that a user may touch.

The floating panel 120 is positioned on a surface (e.g., a rear surface) of the display module 110.

The suspension brackets 130 are formed as leaf springs each having a "Z" shape.

The suspension brackets 130 are connected to a rear side of the floating panel 120 with a gap therebetween. The suspension bracket 130 includes a lower end plate 131, support panels 132, an upper end plate 133, and a reinforcement panel 134.

The lower end plate 131 faces and is connected to the floating panel 120.

The support panels 132 extend perpendicularly from both ends of the lower end plate 131.

The upper end plate 133, which is one plate, connects the support panels 132 branching off from both ends of the lower end plate 131. The upper end plate 133 is positioned at a side opposite to the lower end plate 131. In addition, the upper end plate 133 faces and is connected to the LCD bracket 140.

The lower end plate 131 and the upper end plate 133 may have a plurality of coupling holes 135 which are formed to pass through the lower end plate 131 and the upper end plate 133 to allow bolt coupling using bolts B.

The reinforcement panel 134 is positioned between the plurality of support panels 132 and formed in a "⊂" shape formed to protrude perpendicularly from the lower end plate 131.

The reinforcement panel 134 and an extension part of the lower end plate 131 are formed to have a leaf spring structure which is moved by a coil induced magnetic field.

As another example, the reinforcement panel 134 may include a magnet connection groove (not shown) formed to be recessed at a part of a section thereof, and the magnetic part 150 may be restrictedly inserted into the magnet connection groove.

The magnetic part 150 is connected to the reinforcement panel 134, the coil 160 opposite to the magnetic part 150 is connected to a side end of the LCD bracket 140 facing the reinforcement panel 134.

In this case, the magnetic part 150 may be a permanent magnet or an electromagnet to which a constant current is applied.

The LCD bracket 140 may be opposite to the floating panel 120 with a predetermined distance therebetween.

In this case, a predetermined gap may be maintained between the LCD bracket 140 and the floating panel 120.

According to the present invention, a touch screen (display module) can be vibrated laterally by applying a haptic structure using a lateral vibration type suspension bracket so that convenient and natural tactile feedback can be provided to a user.

In addition, a cost can be reduced using a suspension bracket structure in which functions of a conventional suspension spring and a conventional actuator are integrated. Accordingly, there are effects in that assembly between a LCD bracket and the suspension bracket is simplified and haptic output control desired by the user can be facilitated.

The present invention is not limited to the embodiment described above and can be variously modified within a range allowed by the technical sprit of the present invention.

What is claimed is:

1. A display apparatus for a vehicle, comprising:
   a display module;
   a floating panel disposed on a surface of the display module and having a first surface facing the surface of the display module and a second surface opposite to the first surface;
   a pair of suspension brackets coupled to the second surface of the floating panel and spaced apart from each other;
   a liquid crystal display (LCD) bracket disposed over the second surface of the floating panel and having both ends connected to the pair of suspension brackets, respectively; and
   a magnetic part and a coil disposed at a connection area between the suspension brackets and the LCD bracket and configured to generate lateral vibration.

2. The display apparatus of claim 1, wherein the suspension bracket includes:
   a lower end plate which faces, and is coupled to, the second surface of the floating panel;
   a pair of support panels connected to both ends of the lower end plate, respectively, and extending perpendicularly from the lower end plate; and an upper end plate connected to the pair of support panels, and facing and coupled to the LCD bracket, wherein the lower and upper end plates are respectively positioned on two opposite sides of the pair of support panels.

3. The display apparatus of claim 2, wherein the upper and lower end plates include a coupling hole.

4. The display apparatus of claim 1, wherein the suspension bracket comprises a leaf spring having a "Z" shape.

5. The display apparatus of claim 1, wherein the LCD bracket is positioned over the floating panel with a predetermined gap therebetween.

6. A display apparatus for a vehicle, comprising:
a display module;
a floating panel positioned on a surface of the display module;
a pair of suspension brackets, coupled to a surface of the floating panel, and spaced apart from each other;
a liquid crystal display (LCD) bracket having both ends connected to the pair of suspension brackets, respectively; and
a magnetic part and a coil positioned at a connection area between the suspension brackets and the LCD bracket, and configured to generate lateral vibration,
wherein the suspension bracket includes:
  a lower end plate which faces, and is coupled to, the second surface of the floating panel;
  a pair of support panels connected to both ends of the lower end plate, respectively, and extending perpendicularly from the lower end plate; and
  an upper end plate connected to the pair of support panels, and facing and coupled to the LCD bracket,
  wherein the lower and upper end plates are respectively positioned on two opposite sides of the pair of support panels, and
wherein the suspension bracket further includes a reinforcement panel positioned between the pair of support panels, extending perpendicularly from the lower end plate, and having a "⊂" shape.

7. The display apparatus of claim 6, wherein:
the magnetic part is coupled to the reinforcement panel, and
the coil is coupled to a side surface of the LCD bracket, facing the reinforcement panel.

8. A display apparatus for a vehicle, comprising:
a display module;
a floating panel disposed on a surface of the display module and having a first surface facing the surface of the display module and a second surface opposite to the first surface;
a liquid crystal display (LCD) bracket disposed over the second surface of the floating panel with a predetermined gap therebetween;
a suspension bracket having a leaf spring structure and connected to the second surface of the floating panel and the LCD bracket;
a ferromagnetic part connected to the suspension bracket; and
a coil connected to the LCD bracket and facing the ferromagnetic part.

9. The display apparatus of claim 8, wherein the suspension bracket is configured to maintain the predetermined gap between the LCD bracket and the floating panel.

10. The display apparatus of claim 8, wherein the suspension bracket includes:
a lower end plate coupled to the second surface of the floating panel;
a pair of support panels having a lower end connected to the lower end plate and extending perpendicularly from both ends of the lower end plate, respectively;
an upper end plate connected to an upper end of the pair of support panels and coupled to the LCD bracket; and
a reinforcement panel extending perpendicularly from the lower end plate, positioned between the pair of support panels, and having a "⊂" shape,
wherein the lower and upper end plates are respectively positioned on two opposite sides of the pair of support panels.

11. The display apparatus of claim 10, wherein:
the reinforcement panel includes a magnet connection groove, and
the ferromagnetic part is positioned in the magnet connection groove.

* * * * *